Feb. 6, 1968    J. H. LEMELSON    3,366,993
APPARATUS FOR MOLDING
Filed March 15, 1965
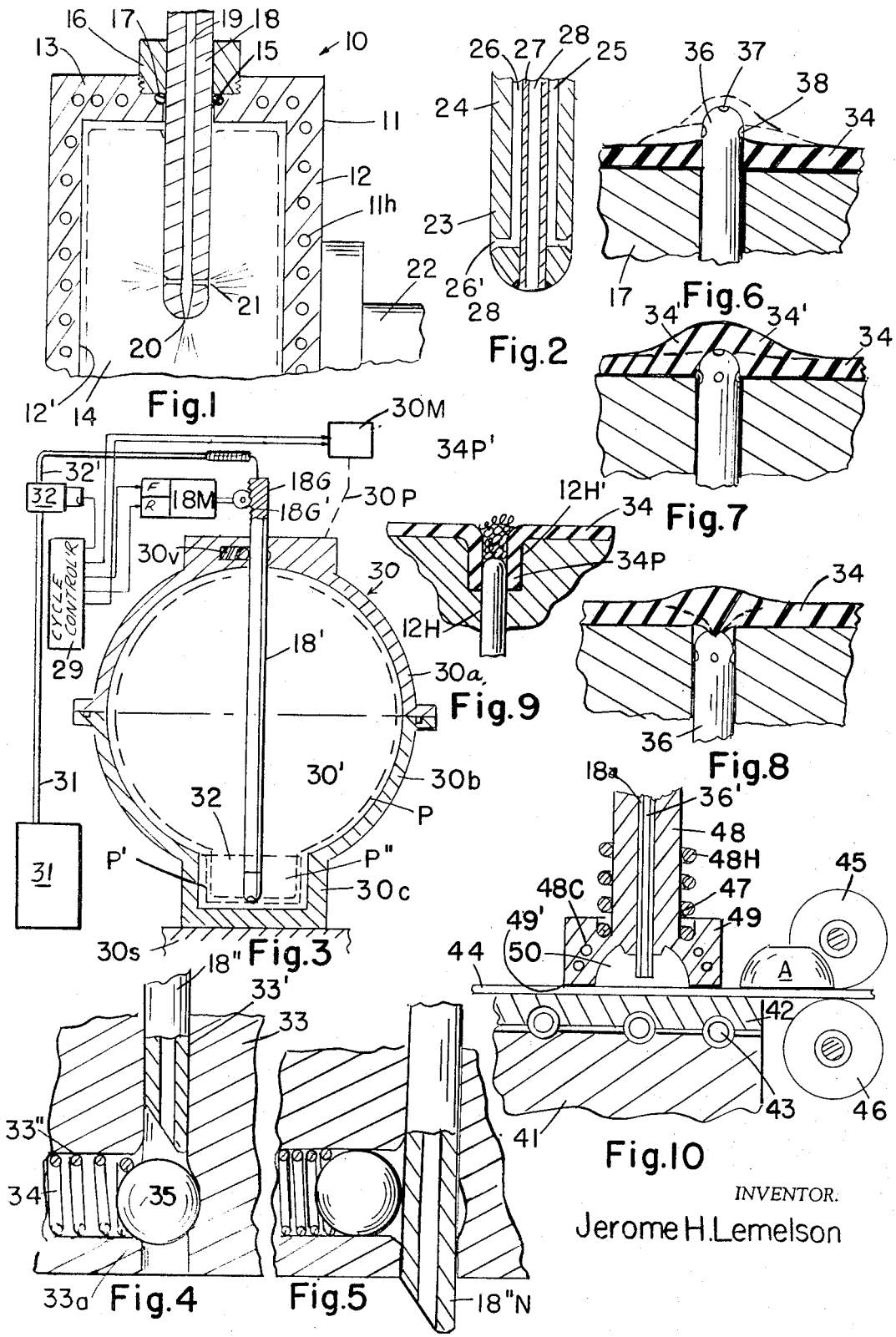
INVENTOR.
Jerome H. Lemelson

United States Patent Office 3,366,993
Patented Feb. 6, 1968

3,366,993
APPARATUS FOR MOLDING
Jerome H. Lemelson, 85 Rector St.,
Metuchen, N.J. 08840
Continuation-in-part of application Ser. No. 734,340,
May 9, 1958. This application Mar. 15, 1965, Ser.
No. 439,548
2 Claims. (Cl. 18—26)

This invention relates to improvements in the art of molding hollow articles and is a continuation-in-part of copending application Serial No. 734,340 filed May 9, 1958, now Patent No. 3,173,175, for Molding Apparatus.

In the art of molding hollow articles from resins such as thermoplastic and thermosetting polymers, the molding material may be admitted to a mold under high or low pressures and caused to conform to the shape of the wall of the mold cavity to form an article when the molding material solidifies from its molten condition. Various problems are encountered when high pressures are utilized to mold articles and the molds are generally substantially more expensive and complex than molds utilized to form articles at relatively low molding pressures. However, various problems are experienced when polymers and other materials are molded at low pressure. For example, low pressure molding is frequently characterized by shrinkage of the molding material, difficulties encountered in causing the molding material to conform to all portions of the wall of the mold cavity, the inability to obtain substantially constant wall thicknesses, the application of molding procedures which require many manual operations, the inherent provision of openings in the wall of the molding, etc.

It is a primary object of this invention to provide new and improved molding apparatus for molding articles at low pressure.

Another object is to provide an improved molding apparatus for molding hollow articles.

Another object is to provide apparatus for molding articles having a shell-like wall at low pressure by the spray application of molding material to the wall of the mold cavity.

Another object is to provide new and improved rotational and slush molding apparatus and an automatic control system therefore.

Another object is to provide an improved molding apparatus employing a belt or conveyor defining a portion of the wall of the molding cavity and further serving to remove articles from the mold itself.

Another object is to provide an improved apparatus for molding and sealing openings in molded hollow bodies.

Another object is to provide an improved apparatus for molding and simultaneously inflating articles of flexible plastic material so as to provide the walls thereof more rigid or self-supporting.

Another object is to provide new and improved structures in molded articles.

With the above and such other objects in view as may hereinafter more fully appear, the invention consists of the novel constructions, combinations and arrangements or parts as will be more fully described and illustrated in the accompanying drawings, but it is to be understood that changes, variations and modifications may be resorted to which fall within the scope of the invention as claimed.

In the drawings:

FIG. 1 is a partial view with parts broken away for clarity of a molding apparatus operative to form hollow articles by spraying molding material against the wall of a mold cavity;

FIG. 2 is a partial view taken in cross section of a modified form of mold material injection means applicable to the apparatus of FIG. 1;

FIG. 3 is a cross sectional view of a mold and auxiliary apparatus for injecting and removing molding material from said mold;

FIG. 4 is a partial view of a mold wall and valve applicable to the apparatus of FIGS. 1 and 3 prior to the insertion of an injector into said valve;

FIG. 5 is a partial view taken in cross section of the valve of FIG. 4 with the injector inserted therein;

FIG. 6 is a partial view taken in cross section of a portion of a mold and wall of an article molded therein with an injector for sealing material penetrating the wall of the article;

FIG. 7 is a view similar to FIG. 6 in which the injector is shown partially withdrawn from the wall of the article after having dispensed sealing material against said wall for sealing the opening therein defined by the injector;

FIG. 8 is a further view of the apparatus of FIGS. 6 and 7 showing the injector completely withdrawn from the wall of the article and the hole defined thereby completely sealed;

FIG. 9 is a partial view taken in cross section of a modified form of a mold, article molded thereagainst an injector of the type illustrated in FIGS. 6 to 8;

FIG. 10 is a partial view taken in cross section of a molding apparatus including means for molding a plurality of articles against a web of material operative to remove said articles from the mold.

In FIG. 1 is shown apparatus for molding thermoplastic materials in what will hereafter be referred to as spray molding. A thermoplastic material such as a liquid or powdered vinyl plastisol, polyethylene or the like is provided and is introduced as a liquid or powder spray or wash into a mold by means of a nozzle and solidifies after it strikes the wall of said mold. The resulting coating is built up to a predetermined thickness by control of the rate of flow through said nozzle and/or the movement of the spraying head of said nozzle in a reciprocating manner in the mold. If a heat curable or setting plastic such as a vinyl plastisol or a powdered thermoplastic is utilized, the walls of the mold are accordingly heated to cure or melt the plastic. If the plastic is a molten polyethylene blend sprayed in droplet form having a temperature in the range of 300 to 400° F. the walls of the mold may be accordingly cooled to solidify the plastic into an article.

The molding apparatus 10 of FIG. 1 comprises a mold 11 having an opening 15 in a wall 13 thereof extending to an enclosed molding cavity volume 14 of said mold. An injection pipe or nozzle 18 is provided which may be driven longitudinally through said opening 15 by a motor driven device (not shown). Multiple openings 20, 21, etc. are drilled in the end of the pipe 18 terminating the liquid inlet to 18 for flowing said liquid as one or more defined sprays in many directions against the side and end walls of the mold and preferably substantially uniformly coating same. Special injection nozzles or spray heads may also be provided in each opening to cause the liquid or particulate plastic to spray or develop wide spray patterns which overlap at the wall and hence coat the whole wall. The notation P refers to a layer of plastic built up on the wall which may result from the spraying action per se or from a combination of spraying and rotation of the mold as the spray is applied. An annular seal 17 may be provided to prevent leakage of plastic between the wall of hold opening 15 and pipe 18.

The nozzle shown in FIG. 2 may be used in the apparatus of FIG. 1 and/or for removing excess amounts of molding material from the mold. It may be operated for simultaneously or sequentially injecting one or more molding materials including liquids and/or powders into a mold through concentric passageways 26 and 28 provided in the nozzle conduit 23 by means of an inner tube 27 disposed within the bore 25 in conduit member or outer tube 24. Notations 26' refer to a plurality of radial orifices communicating with passageway 26 which are operative to direct a plurality of streams or sprays of molding material preferably as a circular sheet-like spray to cover the entire surface of the mold cavity wall with molding material. One or two of such radially extending openings or orifices 26' may also be provided to predeterminedly direct specific sprays or streams of molding material and either the nozzle 23 and/or mold may be controlled in its rotation as the nozzle is controlled in its longitudinal movement for predeterminedly controlling molding material deposition on the wall of the mold for predetermining wall thickness and shape.

In FIG. 1 notation 11h refers to passageways provided in the wall 12 of the mold 11 for circulating hot and/or cold heat transfer fluid therethrough during a molding cycle to cure or melt liquid or particulate molding material sprayed thereagainst and notation 22 refers to a shaft operative to rotate or oscillate the mold if necessary to distribute molding material applied before or after the spraying cyle and/or to separate mold parts for removal of the molded article.

The following procedures are presented for molding materials using the apparatus of the invention.

(a) A single plastic material is injected through the end openings in pipe or conduit 18 as the latter is controlled in its movement back and forth with respect to the cavity 14 until the desired layer or wall thickness is on the walls thereof and solidifies thereon. The nozzle 18 is thereafter completely withdrawn, and the mold may be opened and the molded shell removed from the mold.

(b) The shell P is formed by spray molding as described or by slush, rotational or blow molding with the nozzle 18 inserted as shown either after or before forming said shell. A second fluid such as a plastic protective coating or coloring material is sprayed against the inside of the molding P. If the wall of shell P is transparent or translucent, a sprayed-on, decorative effect on the inside thereof may be attained or the entire inside surface of said shell may be coated with protective plastic. Any liquid or flowable material may be injected through nozzle 18 for use as a filler, partial filler or to decorate the interior of molding P. If molding P has not completely solidified but is still tacky on its inside surface, the liquid or powder material impinged thereagainst through openings 18 may be adhered thereto. Balls and other toy objects may thus be interiorly decorated or be filled with water, sand for weighting purposes or other solid or liquid, such as air or gas for inflating same.

(c) A first plastic which sets or cures either to a rigid or flexible condition may first be sprayed into the mold 12 to a predetermined skin thickness. If slush molded, the excess may be drawn off through the conduit 19 of inlet nozzle 18. A second plastic which sets or cures in either rigid or flexible state may, after the first plastic has solidified, be spray slush or rotationally molded as described to a desired wall thickness inside of the first plastic layer, it being adhered thereto as a result of its inherent adhesive characteristics of the semi-molten plastic. If the second plastic is injected or sprayed at temperature, adhesion may be effected when it melts a layer of the first plastic upon contact and welds thereto.

The first plastic may be soft or relatively flexible polyethylene or plasticized polyvinyl chloride whereby the layer inside thereof may be a more rigid polyethylene or rigid polyvinyl chloride. Or the first layer may be a flexible, plasticized vinyl plastisol and the second a rigid LMW (low molecular weight) blend of polyethylene, whereupon the mold wall is heated to cure the first vinyl layer and cooled to cure the second polyethylene layer. Objects having a rigid inner supporting wall and a more flexible outer skin may thus be produced. If an object with a relatively soft interior is desired with a stronger outer wall or shell it may be produced, for example, by first spray, slush, rotational or blow molding a relatively rigid or linear polyethylene on the inisde surface of the mold and, thereafter spray, slush, rotational or blow molding a second layer of a polyethylene or vinyl of softer or more flexible characteristic which adheres to the inside of the first layer or shell. All these functions may be performed by means of the nozzle-mold device shown in FIGS. 1 and 2 or modifications thereof.

(d) The method described in (c) above may be modified to include, if the outer shell is a transparent, flexible vinyl and the inner shell a rigid plastic such as a rigid vinyl, the provision of a spray or colored pigment to speckle or partially coat the inner surface of the first layer before the second layer is applied thereto.

FIG. 3 illustrates means for slush, rotational or blow molding articles of two different plastic materials, a second of which is molded inside a shell or hollow body made of first plastic supported by the mold wall and said second plastic is adhered to a limited area of the inside surface of said first plastic. The technique is applicable where it is desired to reinforce part of a hollow body, such as the base of a figure for making it more rigid for supporting it or securing it to another object. The first relatively thin shell of plastic is formed in the mold 30 by blow, slush, or rotational molding or is placed therein after forming in another mold. Thereafter a predetermined quantity of a second plastic of greater or less rigidity than the first is injected into the bottom of cavity 30' of mold 30 and allowed to remain therein preferably while the exterior of the mold is cooled, for a predetermined time after which the excess of said second plastic is drawn off through pipe 18' projecting into the still molten puddle P'' of plastic at the bottom of the mold by the operation of cycle controller 29 properly controlling pump 32 to effect the withdrawal of said molten plastic. The resulting lower portion P' of the molding P is adhered to the inside wall of the molding P and may reinforce P for securing it to another object or for use as a solid base thereof. The puddle P'' may also be allowed to completely solidify or the non-solidified portion thereof allowed to run into and coat the rest of the inside molding P after the desired wall thickness of P' has been attained at the lower part of the molding.

Other features illustrated in FIG. 3 include means for automatically controlling molding of the type described. The mold 30 is shown made in two mold sections 30a and 30b with section 30b secured to a frame or base 30S and section 30a being movable relative thereto for opening and closing the mold. A servo device such as a fluid cylinder or electric motor 30M is operatively connected to the mold half 30a by coupling means 30P which may include a plurality of bearing supported rods or other means for predeterminedly moving the mold half 30a away from mold section 30b for removing the molded article and for reversibly moving mold section 30a to engage the face of section 30b for closing the mold prior to injecting the next charge or charges of molding material therein. The mold servo 30M has its forward and reverse controls connected to an automatic cycle controller 29 such as a self-resetting multicircuit timer or other suitable means for generating a sequence of signals on its outputs for controlling mold servo 30M as well as other servo devices described hereafter.

Molding material is provided in one or more reservoirs, one 31 of which is shown having a conduit 31' extending therefrom to a valve or pump 32, the output 32' of which extends to the injection nozzle 18' shown inserted fully into the mold cavity 30'. The nozzle 18' is driven by a motor 18M having an output shaft and gear 18G operative to ride against a spur gear (not shown) attached to or provided in the surface of the nozzle 18' for longitudinally projecting said nozzle into the mold and retracting same therefrom. The motor 18M may also comprise a fluid cylinder having its control inputs operatively connected to the cycle controller 29 which controls the flow of the one or more molding materials, the movement of nozzle 18', servo 30M to open and close the mold and other variables such as elsewhere described herein for automatically controlling a molding cycle.

The cycle controller 29 of FIG. 3 may be of the automatic resetting type and activated to initiate a molding cycle by a timing device therein or may be initiated by limit switch means operated, for example, when the mold sections close one against the other. If a plurality of molding materials are injected and/or partially removed from the mold as described, said cycle controller 29 may be operative to control the flow of each material by controlling one or more pumps, valves or feed means such as injection screws or the like in the feed circuit of the molding material. The apparatus of FIG. 3 may be operative to effect automatic spray molding of the type defined in FIGS. 1 and 2, slush molding, rotational molding or injection molding wherein part of the injected material is removed after solidification of a predetermined quantity thereof against the surface of the mold. The apparatus may also be operative to effect injection of a fluid into the molded part other than molding material such as a gas for pressurizing the molding after it has formed against the surface of the mold wall cavity, the injection of one or more fluids or fluent materials to be contained within the molding and/or the ejection of molding material to seal off the opening in the mold defined by the injection nozzle as hereafter described and illustrated in FIGS. 6 to 9. Any or all of these molding, pressurizing, filling or sealing procedures may be combined in a single molding cycle to provide an article or composite structure or container and product sealed therein.

In FIG. 3, notation 30V refers to a valve which is illustrated in greater detail in FIGS. 4 and 5 and is operative to seal off the opening in the mold if the nozzle 18' is to be completely removed therefrom prior, for example, to effecting rotation of the mold 30 for distributing molding material around the complete surface of the mold cavity wall. If the control means illustrated in FIG. 3 is utilized to produce an article by spray molding as described in FIGS. 1 and 2, the controller 29 may be operative to vary the setting of the servo controlling the valve 32 or the pump motor during a molding cycle so as to vary the flow of molding material sprayed from the orifices at the end of the nozzle 18' while simultaneously controlling the servo 18M to oscillate the nozzle back and forth with respect to the mold cavity wall so as to predetermine the wall thickness of the article and vary or control same along different locations of the mold wall cavity.

FIGS. 4 and 5 ilustrate further details of a nozzle openable valve of the type defined by notation 30V of FIG. 3. An injection nozzle 18" is shown inserted in a passageway 33' in the wall 33 of the mold which passageway extends to the molding cavity as illustrated in FIG. 3. The passageway 33' is normally maintained blocked or closed by a ball 35 which is urged by a coil spring 34 provided in a bore 33" extending to the passageway 33'. The end 18" N end of the nozzle is tapered in shape such that it provides a wedging action against ball 35 to urge said ball out of its seating position blocking the passageway 33' as illustrated in FIG. 4 and into the bore 33" against the action of the coil spring 34 as illustrated in FIG. 5. Once in the position illustrated in FIG. 5, the nozzle 18" communicates with that portion of passageway 33' extending to the cavity of the mold without blockage by the ball 35 so that molding material may be injected through the nozzle into the mold cavity. Upon removal of the nozzle 18", spring 34 urges ball 35 to the position illustrated in FIG. 4 where it blocks the passageway 33', preventing molding material from escaping through the outer portion of the passageway.

A number of further variations in the operation of spray molding apparatus having features taught in FIGS. 1 to 3 or modifications thereof, are noted as follows:

I. As hereinabove disclosed, various types of molding material may be sprayed or flowed from openings in the nozzle (18, 18' or 23) as said nozzle is oscillated and/or rotated relative to the surface of the mold cavity wall. In one form of the invention, the molding material may comprise molten or liquid metal operative to solidify upon striking the wall of the mold or previously deposited molding material disposed against said mold wall. For such a procedure, the wall of the mold is preferably cooled by flowing a heat transfer fluid such as water through the mold wall passageways 11H. Hot molten materials other than metal such as thermoplastic polymers, ceramics and the like may be similarly deposited against the surface 12' of the mold cavity wall in a plurality of passes of the spray nozzle to define a hollow molded article P, the thickness of the wall of which will be a function of the rate of flow of material sprayed against the mold cavity wall and the number of passes made by the spray nozzle in its movement back and forth adjacent said wall. A plurality of similar or dissimilar metals, alloys, ceramics, polymers or other materials may be disposed as different layers of the composite spray molded article, the spraying of each of which is automatically controlled by a cycle controller of the type described operative to predeterminately control the operation of valves, pumps and the like disposed in respective conduits or lines of the fluent molding material.

A molding procedure is also proposed herein in which a gas such as carbon dioxide or other fluid is ejected from the spray nozzle either simultaneously with the ejection therefrom of the molding material or after disposing a layer of molding material against the face of the mold cavity wall or previously deposited layers, said other fluid being operative to rapidly cool the layer of molding material just deposited.

II. In another molding procedure, a thermosetting resin may be sprayed or flowed from the hereinabove described movable nozzle as one or more layers deposited one on the other on the wall of the mold cavity and may be cured thereon by heating the mold wall by the passage of hot heat transfer fluid through passageways 11H, by use of electrical resistance heating means as described in my parent application, by injecting a hot gas through the same nozzle through which the molding material is ejected or by other means of heating the mold as, prior to or immediately after the molding material is so deposited.

III. In a further molding procedure, molding material may be flame sprayed against surface of the mold cavity wall. In other words, the hereinabove described spray nozzles 18, 23 and 18' may be modified or replaced with flame spraying means such as a gas burning flame spray device, plasma spraying equipment or the like. Powdered or molten metal, ceramic or plastic polymers fed to said flame syraying device may be rendered molten and predeterminately deposited against the surface of the mold cavity wall as the spray is directed against different areas thereof to build up an article of predetermined shape and wall thickness. Powdered forms of metal, plastic or ceramic may also be deposited against a mold cavity wall heated as described or heated by an auxiliary heater or flame holder disposed at the end of the spray nozzle. Heat generated by a combustible gas or other material fed through the spray nozzle and burned exterior thereof may also be utilized to set or render molten particulate material disposed against the wall of the mold cavity to form said hollow article. Other forms of heat generating means such as electrical resistance heating means, spark generating means, laser means or the like may be disposed in or on the spray nozzle for performing the functions described.

IV. In addition to applying a plurality of layers of the same or different molding materials which fuse into a unitary wall structure, conventional molding materials may be combined with other forms of material or alternately deposited therewith to form composite articles having particular predetermined characteristics. For example, fibers or filaments of plastic, ceramic, glass or metal may be premixed with the molding material and introduced through the nozzle or flowed through other passageways thereof to combine with molding material simultaneously, previously and/or thereafter applied to form wall structures which are reinforced by said filaments or fibers. Reinforcing filaments or metal whiskers may also be formed at the end of the spray nozzle from a molten material ejected therefrom as a plurality of streams and deposited while semi-molten against the surface of the mold cavity wall to be utilized per se or in combination with one or more other materials such as metal, plastic or ceramic materials applied simultaneously or in succession therewith against the mold cavity wall.

Other solid shapes such as chips, regular or irregular formations of material adapted to become embedded in the molded article may be applied with or without the reinforcing filaments or whiskers at predetermined times during a molding cycle for fabricating composite articles having predetermined physical characteristics.

V. Various solid shapes such as filaments, whiskers, chips, particles or the like may be formed in the gas volume immediately adjacent the spray nozzle by the ejection thereof from the nozzle of the proper material which immediately becomes deposited on the mold cavity wall to provide reinforcements for the article molded thereagainst. Porous walled articles may be mold-shaped by forming or ejecting filaments from the spray nozzle and directing same against the mold cavity wall in a pedetermined manner as described, with or without the simultaneous or intermediate flow of other molten materials. Hot, freshly formed filaments or whiskers of metal, metal-ceramic, compounds, ceramics, polymers or combinations of these materials upon being sprayed against the mold wall in a semi-molten condition may be bonded together as the result of said semi-molten condition or by means of further molding material applied thereto as a fine spray or heat applied to the mold wall or generated by burning, radiant heating means or other means associated with the spray nozzle or auxiliary equipment disposed adjacent thereto such as a burner, hot gas ejecting or generating means, laser or the like.

VI. A still further variation in molding apparatus of the type presented in FIGS. 1–3 includes the deposition of one or more vaporous molding materials against either the surface of the mold cavity wall or molding material previously deposited thereagainst by flow or spraying means as described. For example, a vaporized metal may be glow discharge or electrostatically deposited on the mold wall to provide a thin walled article or as a first layer of a multi-layer article made of different materials. Vaporous metal may also be deposited between layers of other material or materials previously deposited against the mold to form decorative means, reflecting means or an electrical circuit element.

A vapor of a polymer may also be deposited against the mold wall for a period necessary to build up a predetermined thickness thereof or against material previously deposited thereon to provide a decorative layer or coating. A vaporous monomer may be glow discharge deposited against the mold wall or material previously deposited thereon and polymerized in situ thereon to form a polymer for providing a molded article, coating for the molded article or interlayer therefor in providing any of the structures hereinabove described.

Filaments or whiskers of metal or ceramics as described may be reinforced, bonded together or made corrosion resistant by vapor depositing of various materials such as tungsten or tungsten carbide directly on and between the filaments to predetermined depth to weld the filaments together or fill the voids between filaments as may liquid metal, ceramic or plastic sprayed or flowed thereon.

VII. Further techniques applicable to the apparatus described include the application of high in gas or liquid pressures against the surface of surfaces of the article molded as described prior to its removal from the mold to effect changes in its physical characteristics or shape. Intermittent high pressure generated, for example, by pressurizing means coupled to the inlet nozzle or other inlet to the mold or by shock waves generated within the mold may be utilized to predeterminately affect the structure and the shape of the molded article. Such forces may be applied to the molded article prior to or after the complete solidification of the material thereof and prior to or after completion of the molding procedure. In other words, the fluid force or forces may be applied at one or more predetermined times during a molding cycle prior, for example, to the deposition of new molding material against that already deposited on the mold wall.

It has been noted that the program controlled molding apparatus of FIG. 3 may be operated either for spray molding of the type described in FIGS. 1 and 2 or injection molding wherein excess molding material, still in liquid form, is removed from the mold after a predetermined quantity thereof has solidified on the mold cavity wall. Accordlingly, the end portion 18E of the nozzle or pipe 18' is removable therefrom so as to permit use of a plurality of different nozzles or orifice tips operative to spray, flow or inject molding material. It is merely necessary to vary the operation of the programmable cycle controller described for predeterminately varying cycle variables such as rate and time of molding material flow in either or both directions, movement of the spray nozzle, variations in flow of heat transfer fluid or other auxiliary heating means of the type described, etc.

If it is desired to pressurize the interior of the molding prior to its removal from the mold or to admit one or more fluids to the interior of the molded article for purposes described, said function may be automatically controlled by the same cycle controller controlling the other functions by utilizing same to control one or more valves or pumps operative to cause flow of said fluid through the same nozzle used to inject or spray molding material or a separate nozzle penetrating the wall of the mold and article.

A liquid, powder or particulate material may also be dispensed through the same passageway through which molding material is flowed after forming the molded article or through a separate passageway to partially or completely fill the interior of the molded article which may serve as a container for said liquid or particulate material. Sealing of the container may be effected by means described hereafter or other means also automatically controlled by the cycle controller described.

In still another form of the invention, an article may be molded to the shape of the mold cavity wall by conventional blow molding means wherein a parison is extruded between mold halves which are clamped against the parison after which the parison is made to conform to the mold cavity wall by blowing or pressurizing the interior of the pinched off parison. Said blown article may be further fabricated or worked by the means hereinabove described including admitting new material or reinforcements to the interior of the article and depositing same against the inside surface thereof, pressurizing the article, filling or partially filling the formed article with liquid or particulate fluent material or performing any of the described deposition functions. In another procedure, a first shell may be molded in a mold by one or more of the techniques hereinabove described such as by spraying molding material and/or reinforcements against either or both mold halves while separated after which a parison of suitable polymer or other material may be provided between mold sections which are engaged thereagainst. Blowing of the parison against the previously deposited material or molded shell portions will result in fabrication of a composite article of both materials with that molded or sprayed against the wall or walls of the mold defining the outside surface of the article and the blown material, the insider surface thereof.

It is noted that the apparatus of FIGS. 1 to 5 may be modified and utilized for the blow molding of articles of flexible plastic polymers such as plasticized vinyl, low density polyethylene, polyurethane or copolymers such as EVA (ethylene vinyl alcohol) or the like wherein the injection nozzle is utilized to inflate and pressurize the relatively non-supporting molded skin to retain same against the mold wall during its molding and, furthermore, to retain the molding inflated after it is removed from the mold. Such a molding procedure will necessitate the automatic sealing of the opening in the hollow molding provided by insertion of the inflation nozzle (18, 18', 24, etc.) into the mold or molding, the walls of which it penetrates during the formation and or inflation of said article. Sealing such opening without the loss of internal pressure or fluid injected into the molding may be effected by molding or injection means as described hereafter in FIGS. 6 to 9 or by welding or compressing portions of the molding together as the inflation or fluid injection nozzle is withdrawn. Such welding may be effected while the molding material is still semi-molten from molding whereby it welds or fuses together to form a seal when compressed or by locally heating same by any suitable means while the article is in the mold. Compression of a neck, tubular or other formation of the molding to effect said sealing may be effected by movement of the mold, mold sections or portions thereof against the molding material through which the injection nozzle is withdrawn to deform or pinch-off same in a seal. Separate clamping devices or sealing dies may be mounted in or adjacent the mold wall in alignment with the portion of the molding thru which the injection nozzle is withdrawn and operative by program controlled servo-means such as a motor, fluid cylinder or solenoid to clamp and deform or pinch the molding in a manner to close the opening therein as the end of the injection nozzle is withdrawn therefrom, preferably while maintaining fluid inflation pressure.

FIGS. 6 to 9 illustrate means for sealing the interior of a hollow body molded by spray rotational, slush or blow molding with a plastic material which solidifies upon cooling. In FIG. 6 a nozzle 36 or any suitable fluid injection means such as a blowing nozzle or pin is shown just before it is withdrawn from the interior of the mold 12 past the wall 34 or P of the molding. Ordinarily said nozzle leaves an opening in the molding which is unsightly and exposes the interior of the molding to the atmosphere. If it is desired to fill the object with air or water for inflation or ballast, a closure must be provided.

As the nozzle 36 withdraws slowly through the opening in the wall of the molding 34 a small quantity of plastic such as a blend of polyethylenes preferably of higher viscosity than used to mold the shell 34 or any suitable plastic, is exuded through one or more of the end openings 37, 38 in pipe 36 such that it forms an injected glob or puddle 34' around the nose of the nozzle as illustrated in FIG. 7 which completely closes off said opening. Flow of the plastic from 36 may be continued as the nozzle continues to retract to arrive at the condition shown in 8 wherein the plastic completely fills the opening caused by the nozzle and protrudes outward a little therefrom. Said excess may be trimmed off thereafter if necessary. The exact viscosity of the plastic forming puddle 34' will depend on the attitude of the opening in molded wall 34 relative to the vertical, the size of the opening and the rate at which it is exuded as well as the rate the nozzle is withdrawn. Said viscosity is preferably near 10,000 centipoise or greater if injected onto the top of an inner surface which is other than horizontal. In any event, the plastic is preferably slowly injected at such a temperature that it will flow from the opening or openings in injector 36 in such a manner as to fill the hole in the molded wall or shell as 36 retracts and solidifies without flowing along the wall of the molded article.

FIG. 9 shows a modified form of the sealing structure of the method illustrated in FIGS. 6 to 8. A tubular projection 34P is formed as part of the wall of the molding 34 by counterboring the hole 12H at 12H', through which nozzle 36 passes so as to permit filling the annular volume between said nozzle and said counterbored hole with said plastic during molding. A plastic formation 34P' is injected from said nozzle 36 as it (36) retracts and fills the opening of said tubular formation 34P and seals the walls thereof upon solidifying. Part of the filled tubular formation 34P may be later cut off or it may be secured or sealed to another member.

FIG. 10 illustrates a molding apparatus operative to mold a plurality of articles or formations against the upper surface of a sheet or plate which is driven with respect to a mold engaged therewith. A mold member 49 has a face 49' operative to engage the upper surface of a sheet material 44 which is driven across a base member 41 having an upper platen 42 operative to support the sheet 44 from below as the mold is engaged against the other surface of 44. The mold 49 has a cavity 50 opening at the mold face 49'. When surface 49' engages the upper surface of sheet 44, the molding cavity 50 is totally closed thereby with the exception of an inlet 36' through which molding material and other fluids may be flowed. The mold 49 is secured to the end of an arm 48 which is longitudinally movable on its own support (not shown) and driven to engage the face 49' of mold 49 against the upper surface of sheet or plate 44 by a servo means (not shown) such as a hydraulic or pneumatic cylinder or other suitable drive such as an electric motor lineal drive means.

Liquid or fluent molding material such as molten metal, synthetic polymers, ceramics or the like is injected through the inlet 36' to the mold 49 upon sealing engagement of face 49' against sheet or plate 44. The molding material may be injected to completely fill the cavity 50 and solidified into a solid through and through shape A therein. In another form of the invention, that portion of the molding material in cavity 50 which engages the surface of the wall of mold member 49 and the surface of sheet or plate 44 may be solidified leaving a molten core and the molten or liquid material in the core may be drawn off by a nozzle 18a inserted through the inlet 36' into cavity 50 so as to provide a hollow article. The means described in FIGS. 6 to 9 for sealing the opening defined by the injector 18a penetrating the wall of article A may be sealed off by the means provided in FIGS. 6 to 9.

Upon solidification of the article A in cavity 50, the mold member 49 is automatically retracted from the face of sheet 44 and said sheet is driven by a plurality of drive rollers, two of which designated 45 and 46, are illustrated engaging the upper and lower faces of the sheet so as to remove the article A on sheet 44 from the vicinity of the mold 49 permitting the mold to be engaged against a portion of the sheet which does not contain an article such as A. The apparatus of FIG. 10 thus includes means for transferring or transporting articles from a mold immediately after molding same to shape and does not involve complex article handling and transfer means.

Other features of the apparatus of FIG. 10 include, in addition to features as illustrated in FIG. 3 operative to advance and retract the mold 49 and to control flow of molding material as well as movement of sheet 44, a resistance heating coil 48H disposed in or wound around the arm 48 for maintaining the molten molding material in a molten state as it is fed through inlet 36' and a passageway system including one or more passageways 49C extending through the mold 49 through which heat transfer material such as a fluent liquid and/or heated liquid may be passed to cool or heat the wall of the mold 49 for solidifying or curing molding material therein. A second heat transfer means in the form of a ducted sheet 43 is disposed between the upper platen 42 and base 41 to transfer heat with respect to sheet 44 for rapidly cooling or curing molding material disposed against the upper surface of said sheet so as to rapidly form articles A and reduce molding cycle time.

It is also noted that the apparatus of FIG. 10 may be further modified by providing a plurality of molds such as 49 in a rotary array disposed on a rotating drum or frame and operative to tandemly engage a sheet such as 44 retained against said molds in sealing engagement with the outer faces thereof (such as 49') so as to each present a closed molding cavity for forming a molded article against the sheet which is continuously fed past the rotary array of molds as they rotate. It is also noted, that removal of the molded articles A from the mold 49 may be enhanced if a fluid such as air or carbon dioxide is injected through the inlet 36' after or during the solidification of the material in the mold, said fluid being operative to disengage the molded article from the mold as the mold retracts or otherwise is removed from the vicinity of the article and sheet 44. If the fluid is carbon dioxide, said through inlet 36' or the interior of pipe 18a from a container of liquified carbon dioxide, said fluid may also be operative to rapidly cool the molding material and rapidly solidify the article to further reduce molding cycle time.

It is also noted that the sheet 44 may be replaced by a plate or other member of any suitable shape including one having a plurality of cavities and/or other shaped surface portions each of which is operative to be aligned with the mold 49 so as to define articles having surface formations formed thereagainst which are other than planar. In other words, member 44 may also comprise a mold base having a plurality of cavities or other surface formations which are operative to be respectively aligned with mold member 49, one after the other, for intermittently molding similar or different shaped articles defined in part by mold member 49 and/or other mold members disposed in a rotary array as described.

Sheet member 44 may comprise metal, plastic, paper, paperboard or laminations of any of these materials. It may be operative to temporarily or permanently hold the articles A molded thereagainst. For example, if the sheet 44 is metal or metal foil and the material injected into the molding cavity 50 is metal or ceramic at a temperature sufficient to melt or render a portion of sheet 44 semi-molten the articles A cast or injection molded against the sheet or plate may become fused or welded thereto upon solidification of the molding material. Thus metal boses, inserts, stand-offs or reinforcements may be integrally cast or molded against sheet, plate or otherwise shaped members 44 in an automatic manner as described and further operations thereon may include drilling, punching and tapping the cast-on members and/or the sheet member 44 therebeneath to receive fasteners and other members and the like. If both the molded-on on members A and the thermoplastic base member 44 are made of thermoplastic polymers, they may be integrally welded together as the result of heating member 44 to a semi-molten condition when the molding material is disposed thereagainst and the fusion of the two together when the moldings solidify.

Member 44 may also be aluminum foil, paper or paperboard coated on its upper surface with a thermoplastic resin operative when heated by the material molded or cast thereagainst, to temporarily bond said molding to the base in a manner whereby the moldings A are held in plastic during packaging and are removable therefrom by peeling off the surface of member 44. Or the adhesive characteristics of the thermoplastic material molded against the base sheet may be utilized to temporarily hold the moldings against the upper surface of member 44. Thus a plurality of injection molded plastic parts may be molded in situ on paper, foil or plastic sheet material from which they are removable for use by peeling off said sheet, cutting or the like and the sheet 44 may form an insert or part of the wall of the package.

I claim:

1. Molding apparatus comprising a mold having a cavity for receiving molding material to be molded to shape against the walls of said cavity, an opening in said mold defining a passageway communicating with said cavity, valve means including movable means for maintaining said passageway closed during molding, an injection means for fluent molding material including an elongated nozzle operative to eject molding material therefrom, means for advancing said nozzle into said opening upon the alignment of said nozzle and said opening, said valve means being operative to receive said nozzle, said movable means being displaced by said nozzle upon movement of said nozzle against said valve means to open said valve permitting injection of said molding material into said mold from said nozzle.

2. Molding apparatus in accordance with claim 1, said valve means including a ball, seating means for receiving said ball in a position whereby said ball effects complete closure of said valve means, the insertion of said nozzle into said valve means being operative to deflect said ball permitting insertion of said nozzle into said mold and flow of molding material into said cavity.

References Cited

UNITED STATES PATENTS

| | | | |
|---|---|---|---|
| Re. 25,587 | 6/1964 | Wilshire | 18—26 X |
| 1,840,027 | 1/1932 | Fetter | 18—26 X |
| 1,990,260 | 2/1935 | West | 18—26 |
| 2,287,356 | 6/1942 | Newman. | |
| 2,654,343 | 10/1953 | Burbanks et al. | |
| 3,043,711 | 7/1952 | Beale. | |
| 3,151,196 | 9/1964 | Tipton | 18—26 X |
| 3,222,725 | 12/1965 | Smith | 18—26 |
| 2,629,131 | 2/1953 | Martin et al. | |
| 3,173,175 | 3/1965 | Lemelson | 18—26 |
| 2,349,549 | 5/1944 | Hardman et al. | 264—308 |
| 2,498,513 | 2/1950 | Cuypers | 264—308 |
| 2,300,441 | 11/1942 | Veit et al. | 264—96 |
| 2,812,551 | 11/1957 | Chupa | 264—96 |
| 2,961,704 | 11/1960 | White | 18—30 |
| 3,159,878 | 12/1964 | Scott et al. | 18—30 |
| 2,285,370 | 6/1942 | Staelin | 264—309 X |
| 2,838,798 | 6/1958 | Rekettye | 264—96 |
| 3,021,559 | 2/1962 | Strong | 264—96 |
| 3,068,518 | 12/1962 | Miller et al. | 18—26 |
| 246,161 | 8/1881 | Ligowsky | 25—29 X |

FOREIGN PATENTS

| | | |
|---|---|---|
| 330,516 | 6/1930 | Great Britain. |
| 722,189 | 3/1932 | France. |

WILLIAM J. STEPHENSON, *Primary Examiner.*

ROBERT F. WHITE, *Examiner.*

A. R. NOE, *Assistant Examiner.*